(12) United States Patent
Wolfe

(10) Patent No.: US 6,288,649 B1
(45) Date of Patent: Sep. 11, 2001

(54) WEIGHT SENSING APPARATUS

(75) Inventor: George B. Wolfe, Plymouth, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/510,653

(22) Filed: Feb. 22, 2000

(51) Int. Cl.$^7$ .................................................. G08B 21/00
(52) U.S. Cl. ...................... 340/667; 340/666; 340/573.1; 280/728.1; 280/735
(58) Field of Search ................................ 340/666, 667, 340/573.1; 180/271, 268; 701/45, 46, 47; 280/728.1, 728.2, 728.3, 729, 735

(56) References Cited

U.S. PATENT DOCUMENTS

| | | | |
|---|---|---|---|
| 2,708,005 | 5/1955 | Gazzo | 180/82 |
| 3,022,976 | 2/1962 | Zia | 248/430 |
| 3,766,344 | 10/1973 | Nevett | 200/85 A |
| 4,075,443 | 2/1978 | Fatur | 200/85 A |
| 4,361,741 | 11/1982 | Leskoverc et al. | 200/85 A |
| 5,232,243 | 8/1993 | Blackburn et al. | 280/732 |
| 5,481,078 | 1/1996 | Asche | 200/85 A |
| 5,502,284 | 3/1996 | Meiller et al. | 200/85 A |
| 5,542,493 | 8/1996 | Jacobsen et al. | 180/272 |
| 5,570,903 * | 11/1996 | Meister et al. | 280/735 |
| 5,624,132 | 4/1997 | Blackburn et al. | 280/735 |
| 5,720,523 | 2/1998 | Kawabata et al. | 297/338 |
| 5,739,757 * | 4/1998 | Gioutsos | 340/667 |
| 5,810,392 | 9/1998 | Gagnon | 280/735 |
| 5,821,633 * | 10/1998 | Burke et al. | 307/10.1 |
| 5,864,295 | 1/1999 | Jarocha | 340/667 |
| 5,877,677 | 3/1999 | Fleming et al. | 340/436 |
| 5,986,221 * | 11/1999 | Stanley | 177/136 |
| 6,000,717 * | 12/1999 | Rayford | 280/735 |
| 6,039,344 * | 3/2000 | Mehney et al. | 280/735 |
| 6,101,436 * | 8/2000 | Fortune et al. | 701/45 |
| 6,109,117 * | 8/2000 | Stanley et al. | 73/862.325 |
| 6,161,439 * | 8/2000 | Stanley | 73/862.391 |
| 6,161,891 * | 12/2000 | Blakesley | 296/65.01 |

* cited by examiner

Primary Examiner—Jeffery Hofsass
Assistant Examiner—Phung T Nguyen
(74) Attorney, Agent, or Firm—Tarolli, Sundheim, Covell, Tummino & Szabo L.L.P.

(57) ABSTRACT

A vehicle has a seat (12) for a vehicle occupant, a vehicle floor pan (10) for supporting the seat (12), and a weight sensing apparatus (40). The apparatus (40) includes a vehicle seat frame (42), a bracket (44), a member (46), a lever (60), and a sensor (80). The vehicle seat frame (42) supports a weight load of the vehicle occupant in the vehicle seat (12). The weight load of the vehicle occupant in the vehicle seat (12) is transmitted through the bracket (44) from the vehicle seat frame (42) to the vehicle floor pan (10). The member (46) is interposed between the vehicle seat frame (42) and the bracket (44). The member (46) is compressible as the weight load on the seat frame (42) increases and is expandable as the weight load on the seat frame (42) decreases. As the member (46) compresses and expands the seat frame (42) moves vertically relative to the bracket (44). The lever (60) has a first end (62) fixed to and movable with the seat frame (42) and a second end (64) associated with the bracket (44). The lever (60) bends as the seat frame (42) moves vertically relative to the bracket (44). The sensor (80) detects bending of the lever (60) and provides an output weight signal indicative of the amount of bending of the lever (60).

13 Claims, 2 Drawing Sheets

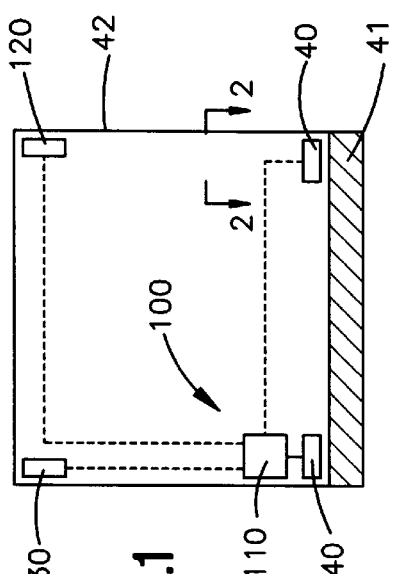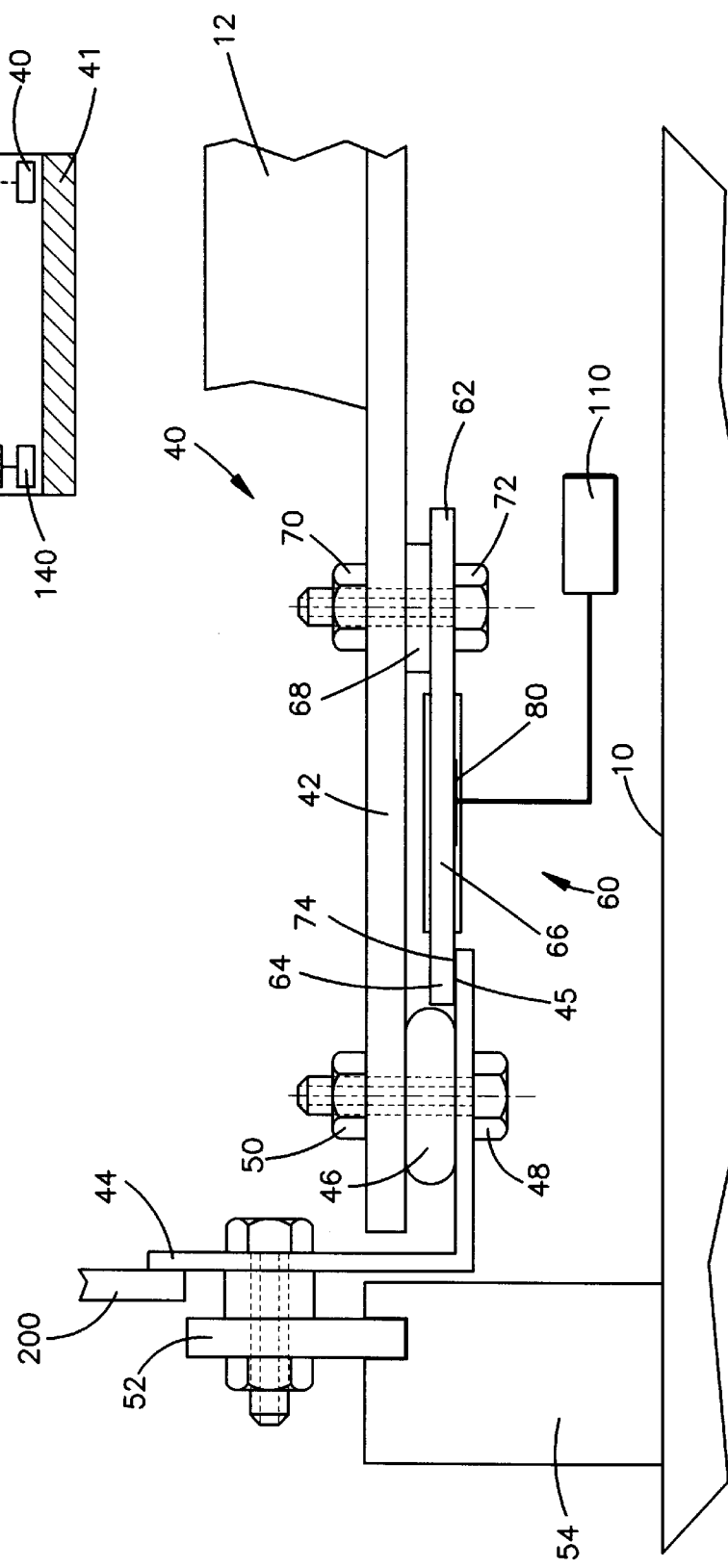

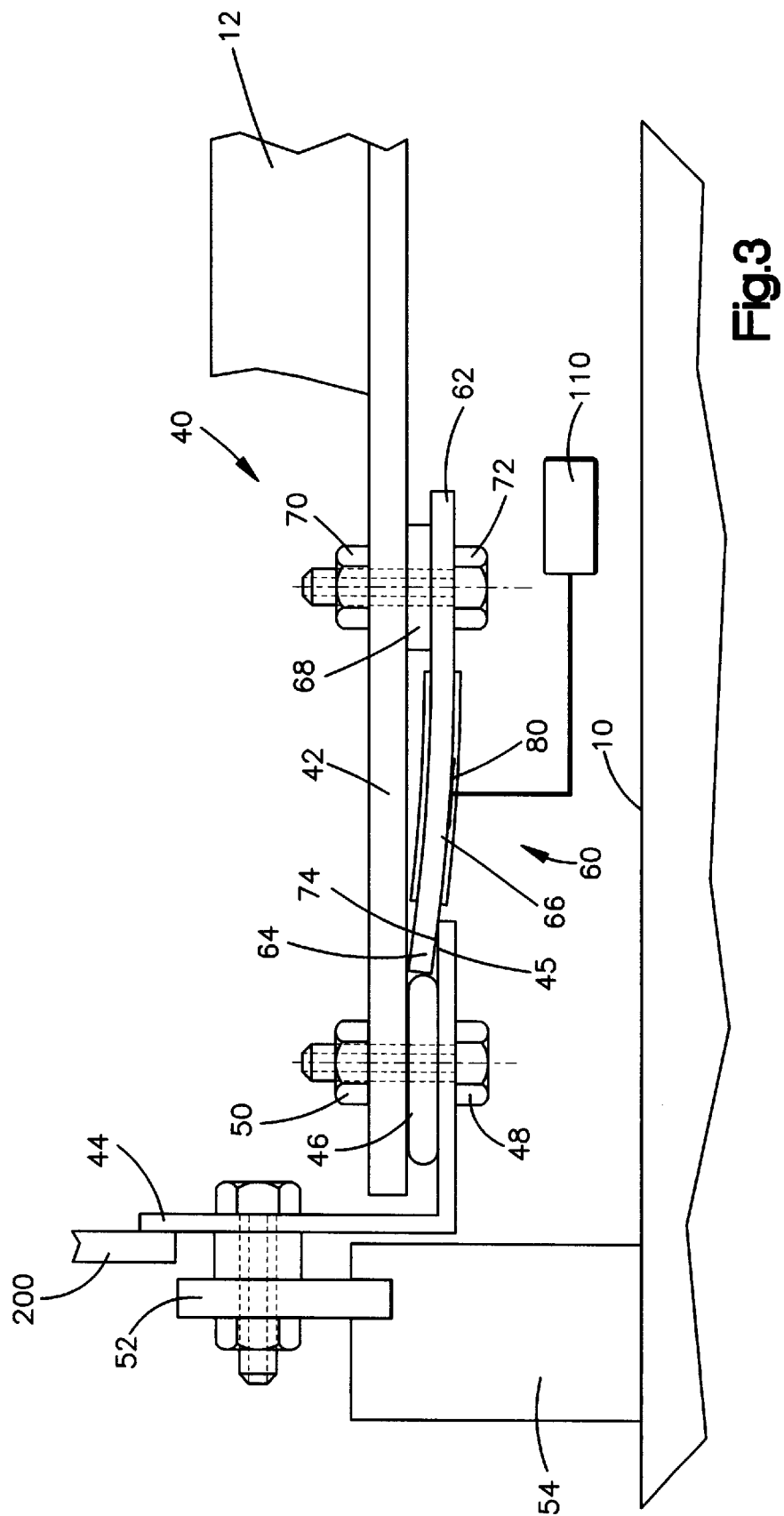

WEIGHT SENSING APPARATUS

TECHNICAL FIELD

The present invention relates to an apparatus for sensing weight, and more particularly, to an apparatus for sensing the weight of an occupant of a vehicle seat.

BACKGROUND OF THE INVENTION

A conventional vehicle occupant weight sensing apparatus includes a weight sensor placed between a vehicle seat frame and a support mount for the seat. The sensor is directly within the vertical load path of the occupant's weight and responds to the weight of the occupant of the seat. In addition, the sensor may respond to torque loads between the seat and the support mount. Since the seat frame and the support mount must withstand large lateral loads (i.e., during crash conditions), typically the sensor also must withstand large lateral loads.

Accordingly, the sensor is typically constructed to withstand lateral loads. This may lessen the sensitivity of the sensor in the vertical load path. Thus, the sensor may not produce a reliable weight output signal.

A weight sensing apparatus which decouples the lateral and vertical loads would allow the construction of a weight sensor that does not have to withstand lateral loads and thereby may be more likely to produce a more accurate occupant weight output signal.

SUMMARY OF THE INVENTION

The present invention relates to an apparatus for use in a vehicle having a seat for a vehicle occupant and a vehicle floor pan for supporting the vehicle seat. The apparatus includes a vehicle seat frame, a bracket, a compressible member, a lever, and sensor. The vehicle seat frame supports a weight load of the vehicle occupant in the vehicle seat. The weight load is transmitted through the bracket from the vehicle seat frame to the vehicle floor pan. The compressible member is interposed between the vehicle seat frame and the bracket. The member is compressed by the weight load on the seat frame, and the amount of compression depends on the weight load on the seat frame. When the weight load on the seat decreases, the compressible member expands. The compressible member compresses and expands as the seat frame moves vertically relative to the bracket. The lever has a first end fixed to and movable with the seat frame and a second end associated with the bracket. The lever bends as the seat frame moves vertically relative to the bracket. The sensor detects bending of the lever and provides an output weight signal indicative of the amount of bending of the lever.

BRIEF DESCRIPTION OF THE DRAWINGS

The foregoing and other features of the invention will become more apparent to one skilled in the art upon consideration of the following description of the invention and the accompanying drawings wherein:

FIG. 1 is a schematic view of an apparatus embodying the present invention;

FIG. 2 is a schematic view of the apparatus of FIG. 1 taken along line 2—2 of FIG. 1; and FIG. 3 is a schematic view of the apparatus of FIG. 2 under a different condition.

DESCRIPTION OF THE PREFERRED EMBODIMENTS

According to the present invention, as shown in FIGS. 1–3, a vehicle occupant weight sensing apparatus 40 is used in a vehicle having a seat 12 for the vehicle occupant. A vehicle floor pan 10 supports the vehicle seat 12. The apparatus 40 includes a vehicle seat frame 42 for supporting the vehicle seat 12, a mounting bracket 44 for supporting the vehicle seat frame 42, a resilient compressible member 46, a generally rectangular lever 60, and a sensor 80.

The vehicle seat frame 42 supports a weight load of the vehicle occupant in the vehicle seat 12. The weight load of the vehicle occupant in the vehicle seat 12 is transmitted through the mounting bracket 44 from the vehicle seat frame 42 to the vehicle floor pan 10.

A lateral guide bolt 48 has a head that engages the mounting bracket 44. The guide bolt 48 extends through the resilient member 46 and the seat frame 42. A nut 50 is screwed onto the bolt 48, and thus the nut 50 and bolt 48 secure the mounting bracket 44, the resilient compressible member 46, and the seat frame 42 together. The nut 50 is tightened against the seat frame 42 (as viewed in FIGS. 2 and 3). The lateral guide bolt 48 supports the seat frame 42 against lateral loads, and allows limited vertical movement (as viewed in FIG. 2) of the seat frame 42 relative to the mounting bracket 44.

The resilient compressible member 46 is interposed between the vehicle seat frame 42 and the mounting bracket 44. The resilient member 46, typically a resilient bushing, is compressible as the weight load on the seat frame 42 increases and is expandable as the weight load on the seat frame 42 decreases. The resilient member 46 compresses (shown exaggerated in FIG. 3) and expands as the seat frame 42 moves vertically relative to the bracket 44. The resilient member 46 is typically formed of rubber or other suitable elastomer.

The lever 60 has a first end 62 fixed to, and movable with, the seat frame 42 and a second end 64 associated with the mounting bracket 44. The lever 60 bends as the seat frame 42 moves vertically downward relative to the mounting bracket 44 (as viewed in FIG. 3). A portion 66 of said lever 60 is over-molded with a polymer for environmentally sealing the sensor 80. The sensor 80 is a strain gauge sensor which is applied to the portion 66 of the lever 60 preferably by a silk-screening process. The lever 60 is typically constructed of an elastic metal such as stainless steel or aluminum.

The first end 62 of the lever 60 has an opening (not shown) for mounting the lever to the seat frame 42. A spacer 68 maintains the lever 60 in an unstressed position when no occupant occupies the vehicle seat 12 (as viewed in FIG. 2). The spacer 68 is located between the lever 60 and the seat frame 42. A nut 70 and bolt 72 fixedly attach the first end 62 of the lever 60 and the spacer 68 to the seat frame 42.

In the preferred embodiment, the thickness of the spacer 68 is approximately equal to the thickness of the resilient member 46 prior to an occupant load applied to the vehicle seat, minus the thickness of the lever 60, but may be other thicknesses as well. Any initial stresses incurred by the sensor 80 due to varying spacer thicknesses, manufacturing tolerances, or assembly tolerances may be factored out during the initial calibration of the sensor 80.

A lower horizontal surface 74 on the second end 64 of the lever 60 abuts and slidingly engages an upper horizontal surface 45 on the mounting bracket 44. The mounting bracket 44 restricts lateral movement of the second end 64 of the lever 60 only by the friction between the horizontal surfaces 45, 74. The lever 60 and bracket 44 may slide when the friction between surfaces 45, 74 is overcome. As a result, relative lateral forces between the seat frame 42 and the bracket 44 (due to manufacturing tolerances, crash conditions, etc.) create minimal lateral or torsional stress in the lever 60.

The lever 60 essentially bends only in a vertical plane about a horizontal axis (as viewed in FIG. 3). The sensor 80 produces an output signal directly proportional to the vertical force applied to the seat frame 42 via the vehicle seat 12 (i.e., the weight of the vehicle occupant).

The same polymer used to over-mold the portion 66 of the lever 60, or another suitable lubricant, may be used to coat the second end 64 of the lever 60 to reduce friction between the lever 60 and the mounting bracket 44, thereby further reducing lateral and torsional stress in the lever 60 incurred by the above stated lateral movement between the seat frame 42 and the mounting bracket 44.

The sensor 80 detects bending of the lever 60 and provides an output, electrical, weight signal indicative of the amount of bending of the lever 60. The sensor 60, while preferably a strain gauge sensor, may be any comparable sensor.

A seat rail 52 is fixedly connected to the bracket 44 by a conventional means. The seat rail 52 engages a seat track 54. Thus, the bracket 44 is supported so that it is vertically stationary and does not move vertically as a result of a load applied to the vehicle seat. The seat rail 52 slides along the seat track 54 for adjusting the seat rearward or forward for occupants of different sizes in the seat during normal operating conditions (i.e., non-crash conditions).

The apparatus 40 is typically placed at a corner of a rectangular seat frame 42 (FIG. 1) and may be used in conjunction with other similar apparatuses 120, 130, 140 to generate multiple weight signals (such as two at the front corners of the seat frame 42 and two at rear corners of the seat frame 42 under the seat back rest 41). The apparatuses 40, 120, 130, 140 may be oriented identically or rotated 90°, 180°, or 270° from each other. An integrated wire harness 100 may transmit the output weight signals from the apparatuses 40, 120, 130, 140 to an electrical controller 110. The controller 110 processes the signals from the apparatuses at each corner of the seat and will generate an output signal indicative of the seat occupant's total weight. The multiple signals also can be analyzed by the controller 110 to produce output signals for controlling an occupant protection device, such as an air bag, seat belt pretensioner, etc.

A seat belt assembly is associated with the vehicle seat. The seat belt assembly includes a seat belt retractor (not shown), mounted for example to the vehicle floor pan 10, and a seat belt buckle 200 (FIG. 2) connected to the mounting bracket 44. The seat belt extends from the retractor to the buckle 200 across a vehicle occupant in the seat.

From the above description of the invention, those skilled in the art will perceive improvements, changes and modifications. Such improvements, changes and modifications are intended to be included within the scope of the appended claims.

Having described the invention, the following is claimed:

1. An apparatus for use in a vehicle having a seat for a vehicle occupant and a vehicle floor pan for supporting the vehicle seat, said apparatus comprising:

a vehicle seat frame for supporting a weight load of the vehicle occupant in the vehicle seat;

a bracket for transmitting the weight load of the vehicle occupant in the vehicle seat from the vehicle seat frame to the vehicle floor pan;

a member interposed between said vehicle seat frame and said bracket, said member being compressible as the weight load on said seat frame increases and being expandable as the weight load on said seat frame decreases, said member compresses and expands as said seat frame moves vertically relative to said bracket;

a lever having a first end fixed to and movable with said seat frame and a second end associated with said bracket, said lever bending as said seat frame moves vertically relative to said bracket; and a sensor for detecting bending of said lever and providing an output weight signal indicative of the amount of bending of said lever.

2. The apparatus as defined in claim 1 wherein said sensor is located on a portion of said lever, said portion of said lever being over-molded with a polymer for environmentally sealing said sensor.

3. The apparatus as defined in claim 1 further including a seat rail fixedly connected to said bracket, said seat rail engaging a seat track and movable on said seat track for adjusting said seat for occupants of different heights.

4. The apparatus as defined in claim 1 further including a spacer located between said lever and said seat frame.

5. The apparatus as defined in claim 1 further including a lateral guide bolt for securing said bracket, said member, and said seat frame together.

6. The apparatus as defined in claim 5 further including a fastener for fixedly connecting said lever to said seat frame.

7. The apparatus as defined in claim 1 further including an integrated wire harness for transmitting said output weight signal from said sensor, said integrated wire harness transmitting said output weight signal and signals from other sensors to a controller.

8. The apparatus as defined in claim 1 wherein said sensor is a strain gauge sensor.

9. An apparatus for use in a vehicle having a seat for a vehicle occupant and a vehicle floor pan for supporting the vehicle seat, said apparatus comprising:

a vehicle seat frame for supporting a weight load of the vehicle occupant in the vehicle seat;

a bracket for transmitting the weight load of the vehicle occupant in the vehicle seat from the vehicle seat frame to the vehicle floor pan, said seat frame moving vertically relative to said bracket as the weight load on said vehicle seat frame changes;

a lever having a first end fixed to and movable with said seat frame and a second end associated with said bracket, said lever bending as said seat frame moves vertically relative to said bracket; and a sensor for detecting bending of said lever and providing an output weight signal indicative of the amount of bending of said lever.

10. The apparatus as defined in claim 9 wherein a horizontal surface of said second end of said lever slidingly engages a horizontal surface of said bracket.

11. The apparatus as defined in claim 9 further including a lateral guide bolt for securing said seat frame and said bracket together.

12. The apparatus as defined in claim 11 further including a resilient bushing interposed between said seat frame and said bracket, said resilient bushing being secured to said bracket and seat frame by said lateral guide bolt.

13. The apparatus as defined in claim 9 further including a compressible member interposed between said vehicle seat frame and said bracket.

* * * * *